C. W. ACKER,

Assignor to G. L. CRANDALL.

Carriage-Curtain Eyelet.

No. 9,029. Reissued Jan. 6, 1880.

Attest:
H. D. Penne
Floyd Norris

Charles W. Acker,
Inventor.
George L. Crandal
Assignee.
By Johnson & Johnson
Atty's

N. PETERS, PHOTO-LITHOGRAPHER, WASHINGTON, D. C.

UNITED STATES PATENT OFFICE.

CHARLES W. ACKER, OF WATERTOWN, NEW YORK, ASSIGNOR TO GEORGE L. CRANDALL.

CARRIAGE-CURTAIN EYELET.

SPECIFICATION forming part of Reissued Letters Patent No. 9,029, dated January 6, 1880.

Original No. 60,608, dated December 18, 1866. Application for Reissue filed November 12, 1879.

*To all whom it may concern:*

Be it known that I, CHARLES W. ACKER, of Watertown, Jefferson county, State of New York, have invented a new and useful Improvement in the Mode of Securing Button-Holes of Carriage-Curtains; and I do hereby declare that the following is a full, clear, and exact description thereof, which will enable others skilled in the art to make and use the same, reference being had to the accompanying drawings, forming a part of this specification, in which—

Figure 1:
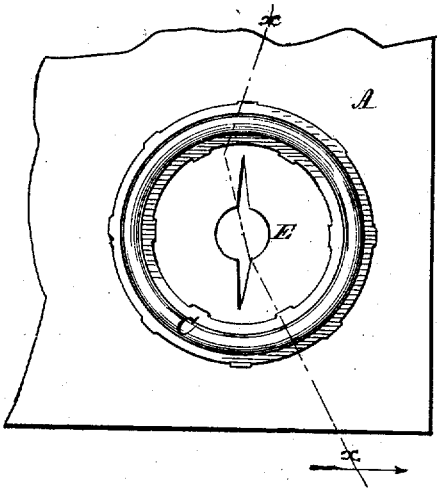
Figure 3:
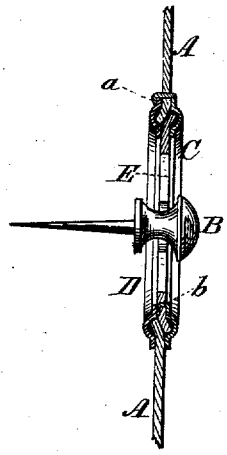
Figure 2:
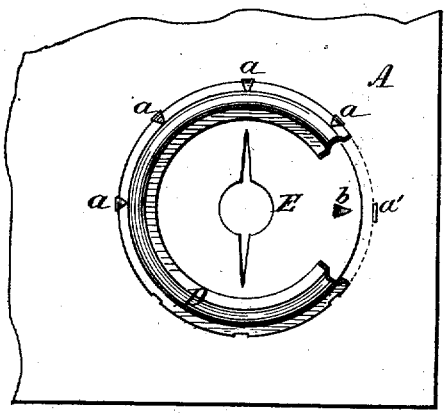
Figure 4:
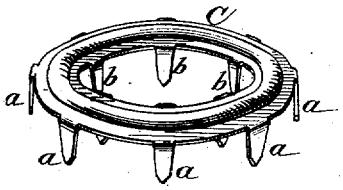
Figure 5:
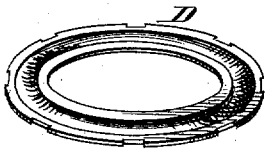
Figure 6:
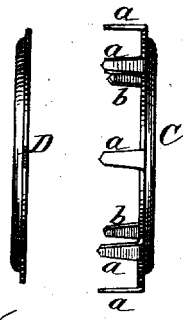

Figure 1 is an outside view of a portion of a carriage-curtain with my improved eyelet attached as securing and inclosing the button-hole. Fig. 2 is an inside view of the same, a portion of the inner ring-plate being broken away to show the manner in which the button-hole piece is secured; Fig. 3, a sectional view of the same, taken through line *x x* of Fig. 1; Fig. 4, the outside toothed ring-plate with the curtain-securing prongs or projections bent at right angles; Fig. 5, the inside or back ring-plate over which the outer row of teeth of the outer ring-plate are clinched after being passed through corresponding punctures in the fabric; and Fig. 6, side views of the rings separated from the curtain and from each other, and showing the bent prongs for securing the two rings and the curtain together.

My invention has for its object to furnish an improved eyelet for securing the button-holes of carriage-curtains; and my said invention consists in an improved eyelet formed by combining two metallic ring-plates, one of which has teeth or prongs, with a curtain which has punctures at a distance from and around the button-hole piece, through which punctures the outer series of teeth or prongs, after being bent at right angles, are passed and bent over the inner ring-plate, thereby firmly holding the two rings together and compressing the fabric in such a manner as to secure the button-hole piece.

A represents a portion of the curtain to which the eyelet is attached, and B represents the knob to which the curtain is to be secured.

C is the outside ring-plate of the eyelet, which is cut out of sheet metal and struck up into substantially the form shown in the drawings—that is to say, it should be struck up with prongs or projections and with a concave or groove on its inner side to receive, in connection with the grooved inner ring, the button-hole piece where it overlaps the edges of the hole cut in the curtain, and which forms what is known as a "button-hole patch." This outside ring-plate is formed with teeth or prongs upon its outer and inner edges, as shown. Those, *a*, formed on the outer edge are pressed out of the same metal as the ring, and then bent at right angles to the same; and the curtain has punctures *a'* made in it at a distance from and around the edge of the button-hole piece, as many as the ring has prongs. These small holes are made to correspond with the prongs *a a* that are inserted through them from the front of the fabric, and secure the ring-binder C D to the curtain. The inner ring-plate, D, is in the general form as the outer one, C, except that it has no teeth or prongs formed upon its edges, and is placed within the prongs *a a* that extend from the back or inner side of the fabric, and the prongs *a a* are bent over the ring D.

The drawings represent the inner plate as having notches formed upon its outer edge to receive the teeth formed upon the outer edge of the plate C. This notching is not essential; but I prefer to make it so, as it gives a neater appearance to the completed eyelet.

The button-hole piece or patch E should be of such size as to extend nearly to the outer edge of the grooves formed in the ring-plates C and D, as shown in Fig. 3, and has a circular hole cut through it for the reception of the neck of the knob B. One or more slits should also be made in said button-hole piece E, extending from the central hole to near the edges of the ring-plates C and D, to enable the head of the knob to pass easily into and out of the eyelet.

The button-hole piece or patch E is secured to the outer plate, C, by turning the teeth or prongs *b*, formed around the inner edge of said ring-plate C, inward, and then passing them through punctures in said button-hole piece and bending them down upon it, as shown. The inner ring-plate, D, is not attached or applied until the eyelet is to be attached to the curtain. A hole is then cut in the curtain of such size that its edge may overlap the edge of the button-hole piece, and the small holes or punctures *a'* are made in the curtain at a distance from and around the button-hole. The teeth or prongs of the plate C are passed through the curtain-punctures. The inner plate, D, is then applied to the inner side of the curtain and the teeth or prongs *a a* closed down upon it, as shown, and the attachment of the eyelet to the curtain is completed.

The ring-plates are struck up in a manner to form biting-edges, and are clamped together with their hollow sides upon the fabric.

Passing the teeth *a* through the separate punctures in the curtain secures the ring-binder directly to the body of the curtain.

Prior to my improvement the button-holes of carriage-curtains were secured by a binding being provided with teeth or prongs, which were passed through a single circular opening cut in the curtain, and then bent so as to be clamped over the cut-out edge of the circular opening to secure the button-hole piece. This binding-eyelet is too insecure, being constantly liable to be pulled out by the knob, and is otherwise objectionable, and is not now found in the trade.

I claim—

1. In a carriage-knob eyelet, the combination, with the carriage-curtain provided with a series of punctures around the button-hole piece, of the outer ring-plate, C, having prongs *a*, and the ring D, the said prongs *a* passing through said curtain-punctures and clinched over said inner ring, D, to bind the rings to the curtain to secure the button-hole piece, substantially as herein set forth.

2. In a carriage-knob eyelet, the combination, with the carriage-curtain provided with a series of punctures around the button-hole piece, of the ring-plate C, provided with teeth or prongs *a b*, the button-hole piece, and the inner binding-ring, the prongs *a* passing through said punctures, and the prongs *b* securing the button-hole piece, substantially as herein set forth.

3. In a carriage-knob eyelet, the combination, with the carriage-curtain provided with a series of punctures around the button-hole piece, of the struck-up outer ring-plate, C, provided with the teeth or prongs *a*, corresponding with said punctures and formed with the biting-edges, and the back ring, D, substantially as and for the purpose herein set forth.

In testimony whereof I have hereunto set my hand this 23d day of October, 1879.

CHAS. W. ACKER.

Witnesses:

JOHN WARD,

ANDREW J. MOORE.